June 17, 1924.

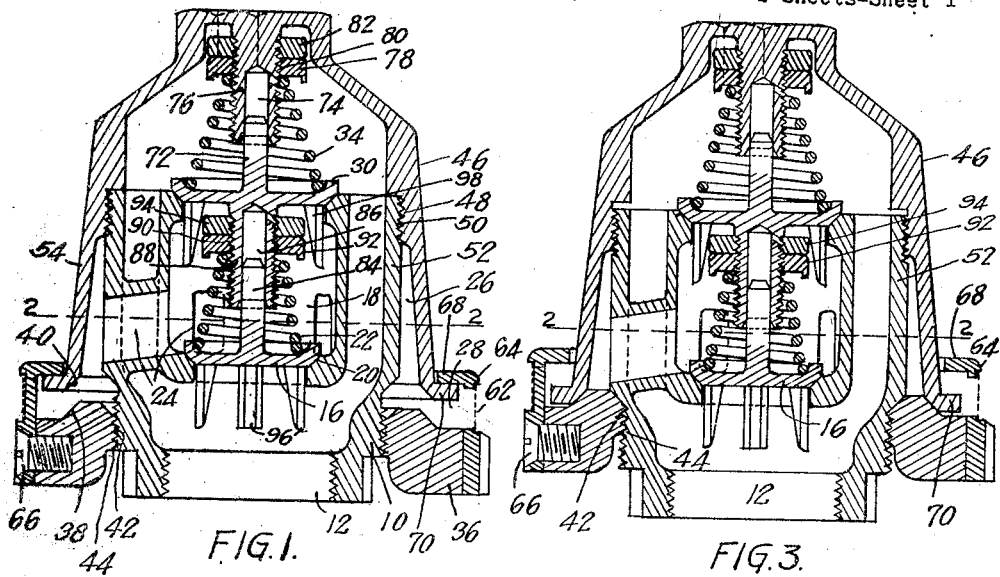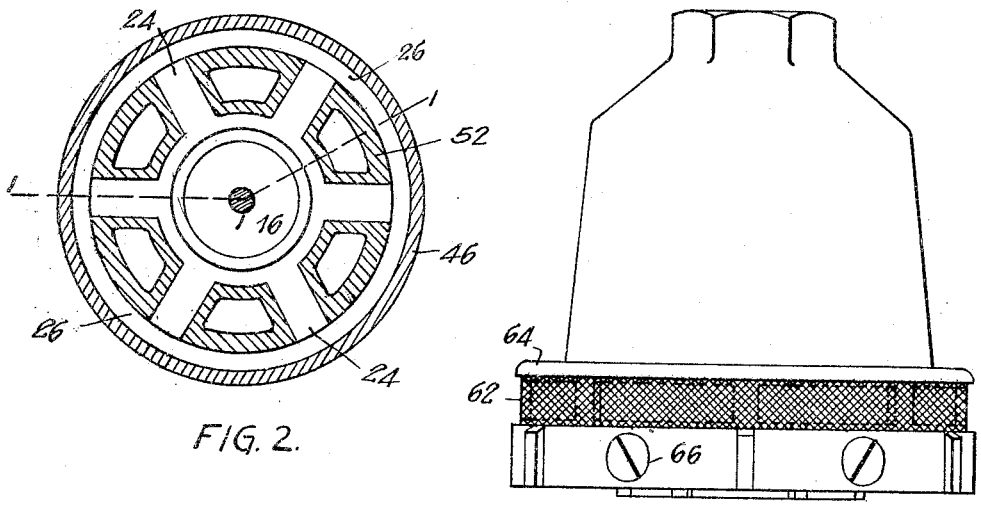

J. C. P. DE KRAFFT 1,498,358

AUTOMATIC TANK VENT VALVE

Filed May 13, 1922

John C. P. De Krafft
INVENTOR.

BY
Cornelius C. Billings
ATTORNEY.

Patented June 17, 1924.

1,498,358

UNITED STATES PATENT OFFICE.

JOHN C. P. DE KRAFFT, OF PHILADELPHIA, PENNSYLVANIA, ASSIGNOR OF ONE-HALF TO WILLIAM H. BALL, OF DETROIT, MICHIGAN.

AUTOMATIC TANK VENT VALVE.

Application filed May 13, 1922. Serial No. 560,578.

*To all whom it may concern:*

Be it known that I, JOHN C. P. DE KRAFFT, a citizen of the United States, and a resident of Philadelphia, county of Philadelphia, State of Pennsylvania, have invented certain new and useful Improvements in Automatic Tank Vent Valves, of which the following is a specification.

This invention relates to a valve device and more particularly to a valve device adapted to close a tank vent for the storage of oil or volatile liquids within definite pressure limits and to also permit said tank to be positively closed under all conditions.

In the storage and transportation of gasoline and petroleum products and other volatile liquids in tanks, tank cars and tank steamers it is desirable to maintain the tank closed under such pressures as are present under normal conditions, in order to avoid an excessive evaporation and loss of liquid, and to permit the vapors to be vented when these pressures are exceeded or when pressures are generated which might burst the tank, or which prevent it from being filled. When the tank is being emptied it is also necessary to open the vent to prevent a vacuum being generated by the withdrawal of the liquid which would prevent further withdrawal. In certain types of tanks or containers, such as tank steamers, certain situations may make it necessary to positively close the tank against the inflow or outflow of liquids or vapors as, for example, in the case of a wreck in which case the vent must be positively closed to prevent the entrance of sea water or the leakage of the liquid being transported. In the case of inflammable liquids it is further desirable to prevent, as far as possible, all danger of the formation of an inflammable mixture within the tank and the transmission of a flame to such a mixture.

An object of this invention is to provide a valve device for containers of the above type by which the container is maintained closed while the pressure within the tank is within definite limits but which will permit the passage of vapors when the pressure passes these limits.

Another object of the invention is to provide a valve device which will remain closed until either an upper or a lower pressure limit is passed and which is also connected to permit its positive manual closure against venting.

A further object of the invention is to provide a valve device adapted to permit the venting of a container under certain pressure conditions and which will prevent the entrance to said valve device of flame, dust and other undesirable matters.

Another object of my invention is to provide a simple and inexpensive double valve structure, each valve acting independently of the other, one valve being moved from its seat upon a definite increase of pressure and the other valve by giving a like motion upon a definite decrease in pressure.

With these and other objects in view, the invention comprises the apparatus described and set forth in the following specification and claims.

The application is a continuation in part of my application Serial No. 472,374 filed May 25, 1921.

Referring to the accompanying drawings:

Fig. 1 is a sectional elevation, taken on line 1—1 of Fig. 2, of a valve device embodying one form of my invention.

Fig. 2 is a cross section on line 2—2 of Fig. 1 of the device shown in Fig. 1.

Fig. 3 is a sectional view of the device similar to the view in Fig. 1 but showing the positive closure means in closed position.

Fig. 4 is an elevation view of the device.

Figure 5:
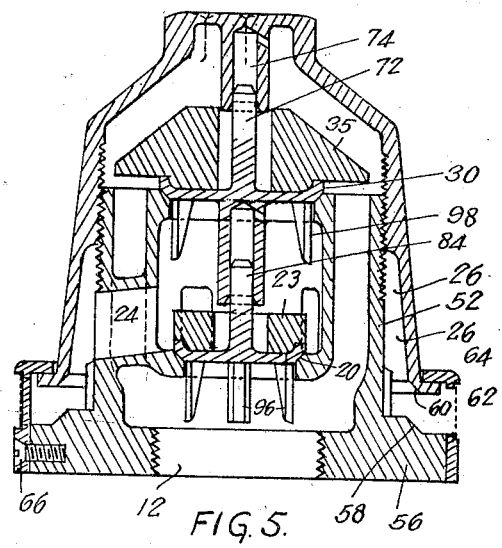
Fig. 5 is a view similar to that of Fig. 1 of a valve device embodying another form of my invention.

In the present invention a casing in which the valve structure is mounted is in communication with the interior of the tank to which it is applied and has also a passage leading to the atmosphere. This passage is, however, closed by a valve opening into said passage which is pressed into closed position with a definite pressure and which is opened to permit vapors and gases to be vented to the atmosphere when the pressure within the casing exceeds this pressure. The passage is also closed by a valve opening outwardly therefrom which is pressed to a closed position on its valve seat with a definite pressure and which is opened by the pressure of the atmosphere when the pressure within the tank and casing are sufficiently below atmospheric pressure to overbalance the closing pressure of the valve. The valves may be pressed on their valve seats by means of springs, weights or equivalent means. The outlet of the passage to the atmosphere may be closed and, for this purpose the outlet or mouth of this passage is preferably annular in shape and is provided with a closure ring which may be moved to close the mouth. A screen is also mounted to surround the outlet mouth of this passage to guard against the passage of spray and dust into the valve device and to prevent the passage of flame into the valve chamber.

Referring more particularly to the accompanying drawings, communication between the interior of a tank and the interior of a valve device casing 10 is provided through a passage 12 having inward threads 14 adapted to receive a threaded exhaust or vent pipe of the tank. The pressure of the vapors and gases in the casing 10 act upwardly on a valve 16 which opens upwardly into a centrally positioned valve chamber 18 and which is pressed downwardly onto its valve seat 20 by means of a spring 22, in the embodiment shown in Figs. 1, 3 and 6, or by means of a weight 23 in the embodiment shown in Figs. 5 and 7.

When the pressure in the tank, and in the casing 10, exceeds that of the spring 22 or of the weight 23 the valve 16 is lifted and the vapors and gases are vented into the valve chamber 18. From the valve chamber 18 the vapors and gases pass outwardly through a number of radial passages 24, the walls of which serve to support the valve chamber, and enter an annular chamber 26 from which they are vented to the atmosphere through an annular mouth 28. When the pressure within the casing and tank is relieved by the venting of the vapors and gases the valve 16 is again pressed onto its seat 20 and the venting of the vapors is stopped.

When the tank is being emptied of its contents the pressure of the vapors and gases within the tank is lowered and the valve 16 is pressed the more firmly onto its seat. To relieve the vacuum created by the removal of the liquid a second valve 30 is provided on the valve chamber in such a manner that it opens from the valve chamber to the casing 10 when a definite vacuum or pressure below atmospheric is reached. The valve 30 is normally pressed onto a valve seat 32 by means of a spring 34, in the embodiment of Figs. 1, 3 and 6, or by means of a weight 35, in the embodiment shown in Figs. 5 and 7. Accordingly the valve 16 opens to vent the tank when a definite excess pressure is generated in the tank, and the valve 30 is opened by the pressure of the atmosphere when a definite vacuum or pressure below atmospheric is present in the tank.

In certain situations or emergencies it may be desirable to entirely and positively close the vent to the atmosphere regardless of the conditions within the tank, as, for example, in the case of a wreck at sea when there is danger of flooding the tank with sea water. For this purpose, the mouth of the passage to the atmosphere may be closed by a vertically adjustable valve, formed, in the modifications shown in Figs. 1, 3 and 6, of a ring 36 having a beveled or valve surface 38 on its upper edge which, in the uppermost position of the ring, closes against a corresponding valve seat 40 of the annular mouth. The ring 36 is mounted on the casing 10 by means of inner screw threads 42 which mesh with corresponding screw threads 44 on the lower surface of the casing 10 below the annular chamber 26 in such a manner that the ring may be adjusted to upper closed position or to its lower open position by rotating the ring on the screw threads 44.

The annular chamber 26 is preferably formed by means of a cap member 46 having inner screwthreads 48 on its upper inner surface which engage corresponding outer screwthreads 50 on the upper outer surface of an inner cylindrical casing member 52 and closing the upper open end of the inner casing member 52. The cap is flared outwardly below the screwthreads 48 to form an outer wall 54 of the annular chamber 26. In the modifications shown in Figs. 1, 3 and 6 the cap is rigidly mounted on the inner casing member. In the modification shown in Figs. 5 and 7, there is no closing ring such as the ring 36 on the lower part of the central casing 52, an immovable ring portion 56 being formed integrally with the inner casing 52 and provided with a valve portion 58. In this modification, however, the cap member 46 is not rigidly mounted on the casing 52 but may be screwed downwardly until a valve surface 60 on its lower edge contacts with the surface 58 and closes the chamber 26.

Figure 7:
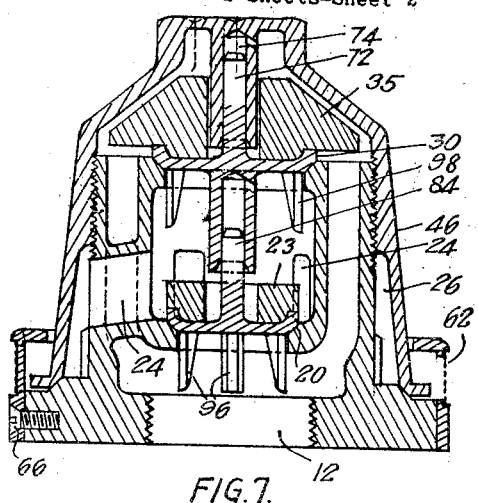
Fig. 7 is a view similar to that of Fig. 5 showing the device of Fig. 5 with the positive closure means in closed position, and, Fig. 8 is an external elevation of the device shown in Figs. 5 and 7.
Figure 6:
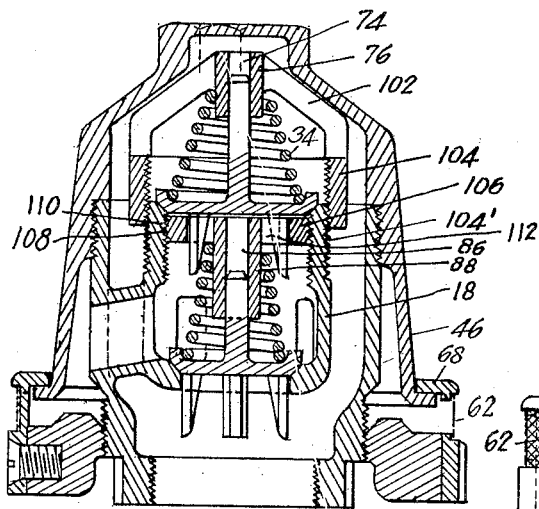
Fig. 6 is a view similar to that of Fig. 1 of a valve device embodying still another form of my invention.
Figure 8:
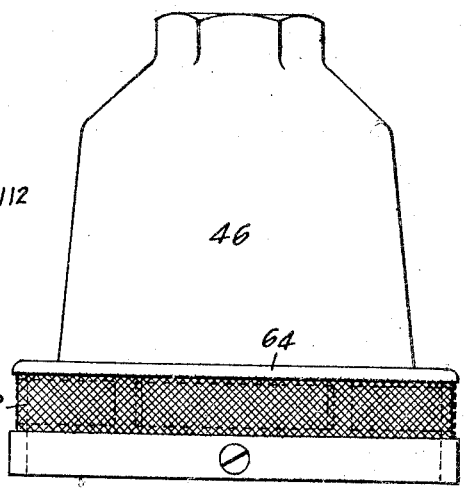

A screen 62 is mounted on the ring 36 of the modification shown in Figs. 1, 3 and 6 or the ring portion 56 of the modification of Figs. 5 and 7, in such a manner as to cover the opening to the chamber 26. The screen is supported on an annular frame 64 which is attached to the ring member by means of screws 66 and has an inwardly projecting flange 68 adapted to rest on an outwardly projecting flange 70 on the lower edge of the cap member 46 when the ring and cap members are in open position. The screen serves to prevent the entrance of dust and spray into the valve structure and to exclude any flame which may be brought into contact with the structure.

In the form shown in Figs. 1 and 3 the valve 30 is guided in its upward and downward movement by means of a stem 72 extending upwardly from the upper surface of the valve and movable vertically in a socket 74 of a boss 76 extending downwardly from the top of the cap member 46. The upper end of the spring 34 is supported by means of a nut 78 mounted on screwthreads 80 on the exterior surface of the boss 76 the position of the nut 78 being secured by means of a lock nut 82.

The lower valve 16 is similarly guided by means of an upwardly extending stem 84 which enters, and is vertically movable in a socket 86 formed in the boss 88 extending downwardly from the lower surface of the upper valve 30. The boss 88 is also provided with an exterior screw surface 90 on which are mounted a nut 92 against which the upper end of the spring 22 bears and a lock nut 94 to hold the nut 92 in position. The valves 16 and 30 are also provided with downwardly extending guides 96 and 98, respectively, which slide in contact with the inner edge of the respective valve seats.

Ordinarily it is desirable to maintain the valve 16 closed against greater pressure than the valve 30. In the above described modification this is attained by the action of the spring 22 opposing the action of the spring 34, the valve 30 being pressed against its seat by the difference between the pressure of the spring 34 and the pressure of the slightly weaker spring 22. The tensions of the springs may be adjusted by adjusting the nuts 78 and 92 to adjust the limiting pressures under which the valves open.

In the modification shown in Figs. 5 and 7, the guides for the valves are arranged similarly to that of Figs. 1 and 3, but weights 23 and 35 are substituted for the springs 22 and 34 as described above.

In the form of the invention shown in Fig. 6, the boss 76 and socket 74 are not carried on the under side of the top of the cap member 46 but are supported on a spider 102 having an internally screwthreaded lower band 104 which engages corresponding outer screwthreads 104′ on the upper portion of the valve chamber 18. No lock nut and supporting nut are required in this case, the upper end of the spring 34 being retained by the upper part of the spider and the adjustment of the spring tension being obtained by turning the spider and thereby adjusting its position vertically on the valve chamber 46.

In this modification the lower socket 86 and boss 88 may be carried by a ring 106 having a screwthreaded outer surface 108 engaging internal screwthreads 110 on the inner surface of the valve chamber 18, instead of being supported from the upper valve 30. The boss 88 is supported on the ring 106 by radial spokes 112 against the lower surfaces of which the upper end of the spring 22 bears. In this form of embodiment of the invention, the actions of the springs 22 and 30 are independent of each other and are separately adjustable by adjusting the position of the spider 102 and the ring 106. The working of this form of the invention is otherwise similar to that of the form of Figs. 1 and 3.

When the above device is mounted on a closed container any vapors under a pressure higher than that for which the device is set are vented by lifting the valve 16 and flowing into the valve chamber 18 and escaping through the passages 24, the annular chamber 26 and the screen 62 to the atmosphere. Similarly when the pressure within the tank falls below the lower limit, atmospheric pressure is transmitted through the passages 24 to the valve chamber 18 and lifts the valve 30 against the downwardly acting pressure and flowing through the passage 12 to the tank.

The invention thereby provides a simple, safe and compact device by which the vapors may be retained in a tank or container under a definite pressure limit and vented when this pressure is exceeded. The invention also provides a device which is particularly safe from fires and accidents and effectually guards against the entrance of dirt and similar substances. The downwardly opening form of the annular outlet opening also shields the valve casing from spray and other finely divided materials which tend to be deflected from the outlet opening independently of the screen. The position of the ring on the casing also serves to indicate whether the outlet vent is closed or open.

Having described the invention what I claim and desire to secure by Letters Patent is:

1. A device of the kind described which comprises a casing having an opening adapted to communicate with the interior of a container and a port leading to the atmosphere, a valve opening from said casing to said outlet port, a valve opening from said outlet port to said casing, each of said valves being operable separately and independently of the operation of the other, and means for resiliently holding said valves to closed position against pressures within definite limits, one of said valves having guide means guided on a co-operating guide means of the other valve.

2. A device of the kind described which comprises, a casing having an opening adapted to communicate with the interior of a container and a port leading to the atmosphere, a valve opening from said casing to said outlet port, a valve opening from said outlet port to said casing, each of said valves being operable separately and independently of the operation of the other, and spring means for yieldingly holding said valves to closed position against pressure within definite limits, one of said valves having a guide stem telescoping in a socket on the other valve.

3. A device of the kind described which comprises a casing having an opening adapted to communicate with the interior of a container and a port leading to the atmosphere, a valve opening from said casing to said outlet port, a valve opening from said outlet port to said casing, each of said valves being operable separately and independently of the operation of the other, spring means for holding said valves to closed position under pressure under definite limits and means for adjusting the pressure of said spring means, one of said valves having a guide stem telescoping in a socket on the other valve.

4. A device of the kind described which comprises a vent casing adapted to communicate with a closed container, a valve chamber in said casing, a passageway from said valve chamber to the atmosphere, a valve opening from said casing to said chamber, a valve opening from said chamber to said casing, a yieldable means for holding said valves to their seats against a pressure within definite limits and manually operable means for closing said passageway from the atmosphere.

5. A device of the kind described which comprises a vent casing adapted to communicate with a closed container, a valve chamber in said casing, a passageway from said valve chamber to the atmosphere, valves opening in reverse directions between said vent casing and said valve chamber and yieldably pressed to closed positions, an annular outlet from said passageway and an annular closing ring adapted to be moved to position to close said annular outlet.

6. A device of the kind described which comprises a vent casing adapted to communicate with a container, a valve chamber in said casing, a passageway from said valve chamber to the atmosphere, valves yieldingly pressed to close access to said valve chamber and adapted to permit flow of fluid to and from said valve chamber when opened, an annular outlet from said passageway, a manually operable closing ring for said annular outlet and a screen covering said outlet.

7. A device of the kind described adapted to resist sudden lateral movements to which unstable platforms are subjected which comprises a vent casing adapted to communicate with a container, a valve chamber in said casing and communicating with the atmosphere, an inlet valve opening from said chamber to said casing, a guide stem extending from said valve, a guide socket receiving said stem, an outlet valve opening to said valve chamber and having a guide stem, and a guide socket for receiving said stem mounted on said inlet valve.

8. A device of the kind described which comprises a vent casing adapted to communicate with a container, a valve chamber in said casing and communicating with the atmosphere, an inlet valve opening from said chamber to said casing, a guide stem extending from said valve, a guide socket receiving said stem, an outlet valve opening to said valve chamber and having a guide stem, a guide socket for receiving said stem mounted on said inlet valve, a spring comprised between said inlet valve and a fixed support and a spring compressed between said inlet and said outlet valves.

9. A device of the kind described which comprises a vent casing adapted to communicate with a container, an outlet passage communicating with said casing, outlet and inlet valves between said casing and said passage, each of said valves being operable separately and independently of the operation of the other, a spring pressing said inlet valve to its seat and a spring compressed between said inlet valve and said outlet valve.

10. A device of the kind described which comprises a vent casing adapted to communicate with a container, a centrally supported valve chamber, passages extending radially from said chamber to the atmosphere, a valve opening from said casing inwardly to said valve chamber, a valve opening from said valve chamber outwardly to said casing, a spring between said outwardly opening valve and a fixed support and a spring between said inwardly and outwardly opening valves.

11. A device of the kind described which comprises a vent casing adapted to communicate with a container, an annular outlet chamber formed in said casing, a central valve supporting chamber, a number of radial passageways connecting said valve supporting chamber and said annular outlet chamber, a valve closing an opening in the upper face of said valve chamber and a valve closing an opening in the lower face of said valve chamber, a spring bearing downwardly on said upper valve and a spring compressed between said upper and said lower valves.

12. A device of the kind described which comprises a vent casing adapted to communicate with a container, an annular outlet chamber formed in said casing and having an annular opening, a central chamber having an opening in its upper wall and an opening in its lower wall, upwardly opening valves on said openings, means yieldingly urging said valves to closing position on said openings, and passages from said central chamber to said annular chamber.

13. A device of the kind described which comprises a vent casing adapted to communicate with a container, an annular outlet chamber formed in said casing and having an annular opening, a central chamber having an opening in its upper wall and an opening in its lower wall, upwardly opening valves on said openings, means yieldingly urging said valves to closed position on said openings, passages from said central chamber to said annular chamber, and a closing ring adapted to be manually moved over said annular opening to close said annular chamber to the atmosphere.

14. A device of the kind described which comprises a vent casing adapted to communicate with a container and having an annular outlet opening to the atmosphere, valve means arranged to permit vapors and gases to pass from said container to atmosphere and from atmosphere to container when the pressure in said container rises above or falls below definite limits and a closure ring movable manually to close said annular opening from the atmosphere.

15. A device of the kind described which comprises a vent casing adapted to communicate with a container and having an annular outlet opening to the atmosphere, valve means arranged to permit vapors and gases to pass from said container to atmosphere and from atmosphere to said container when the pressure in said container rises above or falls below definite limits, a closure ring movable manually to close said annular vent opening from the atmosphere and an annular screen mounted on said ring and covering said opening when open.

16. A device of the kind described which comprises a vent casing adapted to communicate with a container and having a downwardly opening annular outlet opening to the atmosphere, valve means arranged to permit vapors and gases to pass from said container to atmosphere and from atmosphere to said container when the pressure in said container rises above or falls below definite limits and a manually operable annular closure means for said annular outlet.

17. A device of the kind described which comprises a vent casing adapted to communicate with a container, a centrally positioned chamber in said casing, passages from said chamber to the atmosphere, upper and lower openings from said central chamber to said casing, an upper valve and a lower valve for said openings, a spider mounted on said central chamber and extending above said upper valve, a spring compressed between said valve and said spider and a spring between said upper valve and said lower valve.

18. A device of the kind described adapted to resist sudden lateral movement which comprises a vent casing adapted to communicate with a container, a cover secured to said casing, a valve chamber in said casing and communicating with the atmosphere, an inlet valve opening from said chamber to said casing, a guide stem extending from said valve, a guide socket on said cover to receive said stem, an outlet valve opening to said valve chamber and having a guide stem and a guide socket for receiving said stem mounted on said inlet valve, and a spring between the inlet valve and the underside of the cover.

19. A device of the kind described adapted to resist sudden lateral movement which comprises a vent casing adapted to communicate with a container, a valve chamber in said casing and communicating with the atmosphere, an inlet valve opening from said chamber into said casing, a guide stem extending from said valve, a guide socket receiving said stem, on outlet valve opening to said valve chamber and having a guide stem, and a guide socket for receiving said stem mounted on said inlet valve, said guide stems and guide sockets being in substantial alignment with each other.

20. A device of the kind described adapted to resist sudden lateral movement which comprises, a vent casing adapted to communicate with a container, a valve chamber in said casing and communicating with the atmosphere, an inlet valve opening from said chamber into said casing, an outlet valve opening to said valve chamber and having a guide stem, and a guide socket mounted on said inlet valve for receiving said stem.

21. A device of the kind described which comprises a casing having an opening adapted to communicate with the interior of a container and a port leading to the atmosphere, a valve opening from said casing to said outlet port, a valve opening from said outlet port to said casing, each of said valves being operable separately and independently of the operation of the other, and means for holding said valves in closed position against pressures within definite limits, one of said valves having guide means guided on a co-operating guide means of the other valve.

22. A device of the kind described adapted to resist sudden lateral movement to which unstable platforms are subjected which comprises a vent casing adapted to communicate with a container, a valve chamber in said casing and communicating with the atmosphere, an inlet valve opening from said chamber to said casing, a guide stem extending from said valve, a guide socket receiving said stem, an outlet valve opening to said valve chamber and having a guide stem and a guide socket for receiving said stem.

In witness whereof, I have hereunto set my hand at borough of Manhattan, city and State of New York, this 8th day of May, 1922.

JOHN C. P. DE KRAFFT.